United States Patent
Kim et al.

(10) Patent No.: US 9,224,357 B2
(45) Date of Patent: Dec. 29, 2015

(54) APPARATUS AND METHOD FOR COMPENSATING IMAGE OF DISPLAY DEVICE

(71) Applicant: Samsung Display Co., Ltd., Yongin, Gyeonggi-do (KR)

(72) Inventors: Min-Cheol Kim, Yongin (KR); In-Hwan Kim, Yongin (KR); Byung-Geun Jun, Yongin (KR)

(73) Assignee: Samsung Display Co., Ltd. (KR)

( * ) Notice: Subject to any disclaimer, the term of this patent is extended or adjusted under 35 U.S.C. 154(b) by 314 days.

(21) Appl. No.: 13/672,952

(22) Filed: Nov. 9, 2012

(65) Prior Publication Data

US 2014/0028859 A1 Jan. 30, 2014

(30) Foreign Application Priority Data

Jul. 25, 2012 (KR) ........................ 10-2012-0081370

(51) Int. Cl.
*G09G 3/30* (2006.01)
*G09G 5/00* (2006.01)
*G09G 3/32* (2006.01)
*H04N 17/00* (2006.01)
*G09G 3/00* (2006.01)

(52) U.S. Cl.
CPC .................. *G09G 5/001* (2013.01); *G09G 3/30* (2013.01); *G09G 3/3233* (2013.01); *H04N 17/00* (2013.01); *G09G 3/006* (2013.01); *G09G 2300/0842* (2013.01); *G09G 2310/0251* (2013.01); *G09G 2320/0233* (2013.01); *G09G 2320/043* (2013.01); *G09G 2320/0693* (2013.01); *G09G 2360/147* (2013.01)

(58) Field of Classification Search
CPC .............. G09G 2300/0842; G09G 2310/0251; G09G 2320/0233; G09G 2320/043; G09G 2320/0693; G09G 2360/147; G09G 3/006; G09G 3/30; G09G 3/3233; G09G 5/001; H04N 17/00
USPC ......................................... 345/212, 211, 208
See application file for complete search history.

(56) References Cited

U.S. PATENT DOCUMENTS

| | | | |
|---|---|---|---|
| 2009/0028423 A1* | 1/2009 | Sandstrom et al. | 382/149 |
| 2011/0216056 A1* | 9/2011 | Yoo et al. | 345/212 |
| 2012/0162177 A1* | 6/2012 | Lee | 345/211 |

FOREIGN PATENT DOCUMENTS

| | | |
|---|---|---|
| KR | 10-2009-0131042 | 12/2009 |
| KR | 10-2010-0075132 | 7/2010 |
| KR | 10-2012-0000434 | 1/2012 |

* cited by examiner

*Primary Examiner* — Quan-Zhen Wang
*Assistant Examiner* — Tony Davis
(74) *Attorney, Agent, or Firm* — Knobbe Martens Olson & Bear LLP

(57) ABSTRACT

An apparatus and method for compensating an image of a display device are disclosed. The image compensation apparatus of a display device comprises a scatterometer configured to analyze luminance of a display image according to a test initialization voltage and a test data voltage applied to a plurality of pixels and to measure a deviation of a threshold voltage of a driving transistor of the plurality of pixels; a voltage controller configured to divide the display panel into a predetermined area according to a deviation of a threshold voltage of the driving transistor and to calculate different initialization voltages that initialize driving of pixels included in the area on a predetermined area basis; and an initialization voltage supplier configured to apply a corresponding initialization voltage calculated in the voltage controller to the plurality of pixels included in the predetermined area.

18 Claims, 6 Drawing Sheets

APPARATUS AND METHOD FOR COMPENSATING IMAGE OF DISPLAY DEVICE

CROSS-REFERENCE TO RELATED APPLICATIONS

This application claims priority to and the benefit of Korean Patent Application No. 10-2012-0081370 filed in the Korean Intellectual Property Office on Jul. 25, 2012, the entire contents of which are incorporated herein by reference.

BACKGROUND

1. Field

The present disclosure relates to an apparatus and method for compensating an image of a display device.

2. Description of the Related Technology

Flat plate display types include a liquid crystal display (LCD), a field emission display, a plasma display panel (PDP), and an organic light emitting display device.

The organic light emitting display device generally displays an image using an organic light emitting diode that emits light by recombination of electrons and holes. Such an organic light emitting display device is driven with low power while having a fast response speed, has an excellent merit in luminance efficiency, luminance, and a viewing angle and thus has been in the spotlight recently.

In general, organic light emitting display devices are classified into a passive matrix organic light emitting diode (PMOLED) and an active matrix organic light emitting diode (AMOLED) according to a method that drives an organic light emitting diode.

The PMOLED is a method of forming a positive electrode and a negative electrode to be orthogonal and selecting and driving a negative electrode line and a positive electrode line, and the AMOLED is a driving method of integrating a thin film transistor and a capacitor within each pixel and enabling to sustain a voltage by a capacitance. The PMOLED has a simple structure and is driven with a cheap cost, but cannot realize a panel of a large size or high definition. The AMOLED can realize a panel of a large size and high definition, but there is a problem that a control method thereof is technically difficult and the AMOLED is relatively expensive.

An AMOLED selectively emits light in each unit pixel in view of a resolution, a contrast, and an operation speed.

In a pixel of an AMOLED (hereinafter, an organic light emitting display device), a light emitting degree of an organic light emitting diode (OLED) is adjusted by controlling a driving transistor that supplies a driving current according to a data voltage to the OLED.

A deviation in a threshold voltage and current mobility between a plurality of driving transistors may occur within a display panel of the organic light emitting display device. Such a deviation may occur according to poly-silicon characteristics and a production process, a production method, and/or an environment of a driving transistor. Alternatively, such a deviation may occur by deterioration of a driving transistor according to increase of a use time (display period) of the organic light emitting display device.

Due to non-uniform threshold voltage characteristics of a driving transistor, even if the same threshold voltage is applied to each pixel circuit, a light emitting degree of an output pixel becomes different and thus a stain phenomenon like a relatively dark sand grain occurs on a bright screen. That is, when a threshold voltage of a driving transistor is not uniform, even if the same data voltage is applied, a gate-source voltage (Vgs) output of a driving transistor that is directly related to a driving current that is supplied to an OLED becomes different. Therefore, an image is not expressed with accurate grayscale according to a data signal, stain occurs, and a display quality is deteriorated.

Technology that compensates an image through threshold voltage scattering compensation of such a driving transistor has been developed, but nowadays, a display panel is formed in a large size and thus in a trend in which a high speed driving method is requested, it is difficult to fully compensate a threshold voltage of a pixel of an entire display panel.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

Embodiments of the present invention have been made in an effort to provide an apparatus and method for compensating an image having advantages of embodying an accurate grayscale expression and a clear picture quality by compensating threshold voltage scattering of a driving transistor that controls a driving current that is related in a light emitting degree of a pixel in a display device.

Embodiments have been made in an effort to also provide an apparatus and method for compensating an image having advantages of being capable of controlling and compensating a display image on a pixel basis, on a line basis, and on a frame basis in a display panel of a display device.

One embodiment of the present invention provides an image compensation apparatus of a display device including a display panel that displays an image according to a data signal. The image compensation apparatus includes a scatterometer configured to analyze luminance from a display image according to a test initialization voltage and a test data voltage applied to a plurality of pixels included in the display panel and to measure a deviation of a threshold voltage of a driving transistor of the plurality of pixels; a voltage controller configured to divide the display panel into a predetermined area according to a deviation of a threshold voltage of the driving transistor and to calculate different initialization voltages that initialize driving of a plurality of pixels included in the area on a predetermined area basis; and an initialization voltage supplier configured to apply a corresponding initialization voltage calculated in the voltage controller to a plurality of pixels included in the predetermined area.

The image compensation apparatus may further include a data store configured to store luminance analysis information according to the test initialization voltage and the test data voltage received from the scatterometer.

The scatterometer may be configured to measure actual luminance for target luminance of the test data voltage and to divide a deviation of a threshold voltage of the driving transistor according to a degree that deviates from a threshold range of target luminance.

The predetermined area may be one of at least one pixel, at least one pixel line, at least one block including a plurality of pixel lines, or an entire pixel that emits light in one frame.

The initialization voltage may be applied to a gate electrode of a driving transistor of each of the plurality of pixels and initialize a previously written data voltage.

The voltage controller may be configured to calculate each of different initialization voltages applied on the predetermined area basis as a voltage value for corresponding end points of a compensation period of a threshold voltage of a driving transistor of a plurality of pixels included in the predetermined area.

The each of different initialization voltages may be determined as one value of an average value, a maximum value, a minimum value, and a median of a plurality of voltage values that correspond to end points of a threshold voltage compensation period of a driving transistor of a plurality of pixels included in each of the predetermined area.

The initialization voltage supplier may be configured to differently apply the different initialization voltages according to a division form of the predetermined area.

The initialization voltage supplier may be configured to include a plurality of resistors coupled in series. The initialization voltage supply unit may be configured to divide a predetermined reference voltage into different initialization voltage values calculated in the voltage controller and to supply the different initialization voltage values through an initialization voltage wire connected to each of the plurality of pixels.

The initialization voltage supplier may divide a predetermined reference voltage into different initialization voltage values calculated in the voltage controller and to supply the different initialization voltage values through a data line connected to each of the plurality of pixels.

Each of the plurality of pixels may include an organic light emitting diode (OLED) configured to emit light according to a driving current corresponding to a data signal; a driving transistor configured to transfer a driving current corresponding to the data signal to the OLED; a switching transistor configured to transfer a data voltage according to the data signal to a gate electrode of the driving transistor; a threshold voltage compensation transistor configured to diode-connect a gate electrode and a drain electrode of the driving transistor; and an initialization transistor configured to apply a corresponding initialization voltage calculated in the voltage controller to the gate electrode of the driving transistor.

Each of the plurality of pixels may further include a storage capacitor connected between the gate electrode of the driving transistor and the driving power source voltage source of the pixel.

Another embodiment provides a method of compensating an image of a display device, the method including: displaying a test image by applying a test initialization voltage and a test data voltage to a plurality of pixels included in a display panel; measuring a deviation of a threshold voltage of the driving transistor of the plurality of pixels by analyzing luminance from the test image of the display panel; dividing the display panel into a predetermined area according to the deviation of a threshold voltage of the driving transistor and calculating different initialization voltages that initialize driving of a plurality of pixels included in the area on the predetermined area basis; and applying the calculated corresponding initialization voltage to a plurality of pixels included in the predetermined area.

The displaying of the test image and the measuring of the deviation may be performed by alternately repeating the test initialization voltage and the test data voltage.

The measuring of the deviation may include storing luminance analysis information that analyzes a test image of the display panel according to the test initialization voltage and the test data voltage.

The measuring of the deviation may include measuring actual luminance for target luminance of the test data voltage and dividing a deviation of a threshold voltage of the driving transistor according to a degree that deviates from a threshold range of the target luminance.

The calculating of different initialization voltages may include calculating a voltage value for corresponding end points of a compensation period of a threshold voltage of a driving transistor of a plurality of pixels that are included in the predetermined area.

The applying of the calculated corresponding initialization voltage may include differently applying the calculated different initialization voltages according to a division form of the predetermined area.

The calculated different initialization voltages may be applied through a data line of the pixel, when the predetermined area is at least one pixel. The calculated different initialization voltages may be applied through an initialization voltage wire that is connected to the pixel, when the predetermined area is one of at least one pixel line, at least one block including a plurality of pixel lines, or an entire pixel that emits light in one frame.

The applying of the calculated corresponding initialization voltage may be performed before a threshold voltage of a driving transistor of each of a plurality of pixels is compensated among a driving period in order to display an image according to a data signal corresponding to each of a plurality of pixels that are included in the display panel.

According to embodiments of the present invention, even under high speed driving of a large-sized display device, scattering of a threshold voltage of a driving transistor of a pixel can be compensated and thus grayscale stain of a display image can be prevented and a clear image quality can be embodied.

Further, a time necessary for compensating an image can be reduced through compensation of threshold voltage scattering of a plurality of driving transistors of a display panel, and thus an image compensation apparatus can be easily applied to a large-sized display device, an image quality of the display device can be improved, and high speed driving can be simultaneously performed.

DETAILED DESCRIPTION OF CERTAIN INVENTIVE EMBODIMENTS

Figure 1:
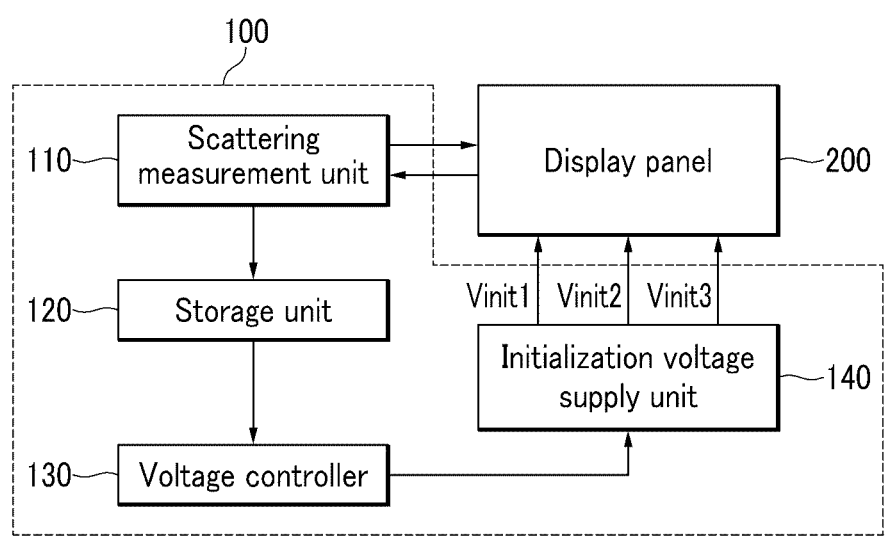
FIG. 1 is a block diagram illustrating a configuration of an image compensation apparatus of a display device according to an embodiment of the present invention.

The present invention will be described more fully hereinafter with reference to the accompanying drawings, in which certain embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals generally designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a block diagram illustrating a configuration of an image compensation apparatus of a display device according to an embodiment of the present invention.

An image compensation apparatus 100 according to an embodiment of the present invention is connected to a display panel 200 and embodies a clear image of a high quality by compensating a defect or grayscale stain of an image that is displayed in the display panel 200.

The display panel 200 to which the image compensation apparatus 100 is applied is not particularly limited. In some embodiments, the display panel 200 may be a display panel of an AMOLED.

Referring to FIG. 1, the image compensation apparatus 100 includes a scatterometer 110, which is also referred to herein as a scattering measurement unit. The image compensation apparatus also includes a storage unit 120, a voltage controller 130, and an initialization voltage supply unit 140.

The scattering measurement unit 110 is connected to the display panel 200 and measures a deviation (scattering) of a threshold voltage of a driving transistor of each of a plurality of pixels that are included in the display panel 200.

In order to measure scattering of a driving transistor of a pixel of the display panel 200, the scattering measurement unit 110 provides a predetermined voltage setting value for enabling the display panel 200 to display a test image. In this case, the provided voltage setting value includes a test data voltage value and a test initialization voltage value of a test image.

The test data voltage value is a data voltage that is supplied for a test to a data line of each of a plurality of pixels of the display panel 200 and is a data voltage having the same grayscale information in which an entire pixel can emit light with the same predetermined target luminance.

The test initialization voltage value is an initialization voltage that is equally transferred to an entire pixel in order to initialize a driving current of each of a plurality of pixels of the display panel 200. Because various methods of initializing driving of a pixel that is included in the display panel may exist according to a characteristic and a kind of the display panel, an applied method of the test initialization voltage is not particularly limited. For example, when a pixel is a self-luminant element such as an organic light emitting element, in order to initialize a driving current that is transferred to the organic light emitting element to a predetermined value, a test initialization voltage may be applied to a control element (driving transistor).

When the scattering measurement unit 110 transfers a setting value of a predetermined test data voltage value and a predetermined test initialization voltage value to the display panel 200, the display panel 200 is initialized to a test initialization voltage and is displayed with an image according to a test data voltage. Although not specifically shown in FIG. 1, setting values of the scattering measurement unit 110 are transferred to a driver of the display panel 200. In the display panel 200, a driving IC that drives a display panel in order to display a test image can be any existing driver and thus a detailed description thereof will be omitted.

The display panel 200 is driven by driving power that supplied from the outside, initializes each pixel using setting values that are transferred from the scattering measurement unit 110, and displays an image according to a test data voltage.

The scattering measurement unit 110 analyzes luminance of a test image that is displayed in the display panel 200. The scattering measurement unit 110 measures that the display panel 200 actually emits light with which luminance value against target luminance corresponding to a test data voltage value. Target luminance is luminance with light of ideal emittance according to grayscale information corresponding to a test data voltage.

The scattering measurement unit 110 repeatedly analyzes luminance of a test image of the display panel 200 while differently adjusting setting of the test data voltage value and the test initialization voltage value. When the scattering measurement unit 110 repeatedly analyzes luminance of a test image of the display panel 200, all driving conditions and driving times of the display panel 200, except for setting values that are transferred from the scattering measurement unit 110 are always equally fixed. In a state in which a driving environment such as external driving power, a pixel circuit structure, and a wire, an initialization time, a threshold voltage compensation time, scan, a data writing time, and a driving time such as a light emitting time are always constantly fixed, a repeated test image is displayed.

In the display panel 200, a test image is repeatedly displayed, and grayscale information and setting voltage values that are acquired through a process of analyzing luminance of a test image in the scattering measurement unit 110 are transferred to and stored in the storage unit 120.

The storage unit 120 is connected to the scattering measurement unit 110 to receive various information about a test image of the display panel from the scattering measurement unit 110 and stores the various information in, for example, a lookup table form. The lookup table that is stored in the storage unit 120 is a grayscale value that is actually displayed in the display panel 200 to correspond to a test data voltage having a predetermined luminance value and represents a relationship of grayscale information changing as an initialization voltage that is applied to a pixel of the display panel 200 changes.

When the display panel 200 displays an image according to an outside image signal, the voltage controller 130 sets an initialization voltage for compensating threshold voltage scattering of a plurality of driving transistors. The voltage controller 130 uses a lookup table of a grayscale information relationship of an initialization voltage of the display panel 200 that is stored at the storage unit 120.

Because threshold voltage characteristics of a driving transistor of each pixel of the display panel 200 are different, a grayscale stain may occur in an image according to a test data voltage. An occurrence degree of grayscale stain is influenced by a deviation between target luminance and actual luminance of a test data voltage.

Therefore, when a predetermined threshold range of target luminance is set and actual luminance deviates from such a threshold range, an area that differently sets an initialization voltage of a corresponding pixel of the display panel 200 in a pixel unit, a pixel line unit, a block unit that is grouped into a pixel group, or a frame unit, is determined. Scattering of a threshold voltage of a driving transistor of a pixel may be divided according to a degree in which the actual luminance varies from a threshold range of target luminance. Levels in which actual luminance varies from a threshold range of target luminance are divided, and the levels are grouped into a predetermined group, and it is regarded that characteristics of a threshold voltage of a driving transistor of a pixel belonging to a corresponding group are similar.

When the scattering measurement unit 110 displays an image of a display panel while changing an initialization voltage on a pixel basis, on a line basis, on a block basis, and on a frame basis, the voltage controller 130 determines an initialization voltage of a corresponding area in a level in which grayscale stain does not occur. Occurrence of grayscale stain indicates that a luminance deviation surpasses a threshold range as a threshold voltage of a driving transistor of a pixel that is included in a corresponding area (pixel, line, block, and frame area) is not fully compensated.

Therefore, after an area of an initialization voltage control of the display panel 200 is determined, the voltage controller 130 determines an initialization voltage immediately before grayscale stain occurs on each area basis using a lookup table to an actual applied voltage.

For example, in a test of the display panel 200, even if the same test data voltage is applied, when grayscale stain is differently represented in a 1-pixel line, a 2-pixel line, and a 3-pixel line, the voltage controller 130 sets a control target area of an initialization voltage in a pixel line unit and determines an initialization voltage that is applied to each pixel line.

In this example, because threshold voltages of a driving transistor of pixels that are each included in a 1-pixel line, a 2-pixel line, and a 3-pixel line are different, even if the display panel 200 is driven with the same compensation and driving time, grayscale stain of an image that is displayed in the each pixel line differently occurs. For example, when a test initialization voltage is applied as 1V, because a threshold voltage of pixels of the 1-pixel line and the 2-pixel line is in a range of −1 to 1V, the threshold voltage is fully compensated for a predetermined compensation period, but because a threshold voltage of pixels of the 3-pixel line is in a range of −1 V or less, the threshold voltage is not compensated for the compensation period. Therefore, when equally initializing a pixel of all panels with an initialization voltage of 1V, an image is not displayed with accurate luminance in an area of the 3-pixel line and thus stain occurs.

Therefore, the voltage controller 130 differently determines an initialization voltage so that all threshold voltages are compensated for the same compensation period on each pixel line basis. When an initialization voltage is gradually applied lower than 1V in a 3-pixel line area in the above example using a lookup table of the storage unit 120, a voltage value (for example, −1V) in which grayscale stain does not occur in the same compensation period may be found, and the voltage value is set as an initialization voltage value that applies to a pixel of the 3-pixel line.

A method of determining an initialization voltage in the voltage controller 130 is an illustration and is not limited thereto and may be determined according to a form of a predetermined area that differently receives an initialization voltage.

When an initialization voltage is differently supplied in a pixel unit, an initialization voltage of a corresponding pixel may be obtained using a lookup table of the storage unit 120.

When an initialization voltage is differently supplied in a line unit or in a block unit including a plurality of pixel lines, the voltage controller 130 determines a plurality of initialization voltages of each of a plurality of pixels that are included within a corresponding line or block using a lookup table and determines an initialization voltage with an average value, a maximum value, a minimum value, or a median of the plurality of initialization voltages.

When an initialization voltage is differently supplied in a frame unit, the voltage controller 130 determines an initialization voltage of a pixel of an entire display panel using a lookup table and determines an initialization voltage with an average value, a maximum value, a minimum value, or a median.

Figure 2:
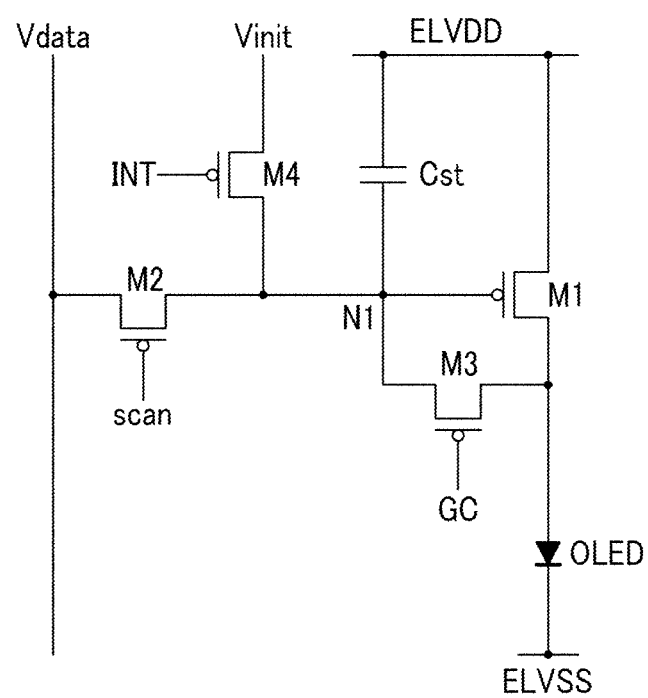
FIG. 2 is a circuit diagram illustrating a typical circuit structure of a pixel that is included in a display panel to be a compensation target of an image compensation apparatus according to an embodiment of the present invention.

In one embodiment, a pixel structure included in the display panel 200 is formed with a PMOS transistor, as shown in FIG. 2. A method of initializing a pixel is a method of applying an initialization voltage to a gate voltage of a PMOS driving transistor of the pixel.

In the above description, a constituent element of a pixel is assumed to be a PMOS, but when a constituent element of a pixel is an NMOS transistor in other embodiments, in contrast, while gradually increasing an initialization voltage value in a lookup table, a voltage value appropriate to compensation of a corresponding area may be found out.

A specific circuit structure according to an embodiment of a pixel that is included in the display panel 200 will be described with reference to FIG. 2.

After the voltage controller 130 differently determines an initialization voltage value on a predetermined area basis of the display panel 200, initialization voltage information is transferred to the initialization voltage supply unit 140. Thereafter, the initialization voltage supply unit 140 supplies initialization voltages that are each set on the predetermined area basis to a pixel of a corresponding setting area.

The initialization voltage supply unit 140 includes a digital-analog converter (DAC) and includes an R-string in which a plurality of resistors is coupled in series between a reference voltage and a ground voltage.

A form in which the initialization voltage supply unit 140 supplies different initialization voltages to each predetermined area of the display panel 200 may be different according to a predetermined area unit. An initialization voltage may be supplied through a separate voltage wire according to a predetermined area unit of the display panel 200, or may be supplied at a time different from a data writing time using an existing disposed data line.

Each initialization voltage output method of the initialization voltage supply unit 140 and a supply form to the display panel 200 are not particularly limited.

When a basic unit of the predetermined area is an individual pixel, an initialization voltage value that is applied to each pixel from the voltage controller 130 is determined. Thereafter, the initialization voltage supply unit 140 outputs different initialization voltages to an individual pixel through a voltage distribution. A supply form of initialization voltages that are differently determined in each pixel is not limited, but when a predetermined area is a pixel unit, a data line that is connected to each pixel may be used.

When a basic unit of the predetermined area is a pixel line or a block including a plurality of pixel lines, the initialization voltage supply unit 140 differently distributes and supplies an initialization voltage through an initialization voltage wire that is formed in a line unit. When an area is determined to three blocks, the embodiment of FIG. 1 represents that different first initialization voltage Vinit1, second initialization voltage Vinit2, and third initialization voltage Vinit3 are distributed and supplied at each block.

Further, a basic unit of the predetermined area may be a frame unit, and in such a case, an initialization voltage value that is transferred to the entire display panel 200 may be differently set and applied to each frame. In this case, the initialization voltage supply unit 140 outputs an initialization voltage with different outputs in every frame to the display panel 200.

FIG. 2 is a circuit diagram illustrating a typical circuit structure of a pixel that is included in a display panel to be a compensation target of an image compensation apparatus according to an embodiment of the present invention.

Referring to FIG. 2, a pixel is formed with an organic light emitting diode (OLED) and a driving circuit that drives the OLED. The driving circuit is formed with four transistors M1 to M4 and one capacitor Cst. Such a circuit structure of FIG. 2 is an example and the present invention is not limited to such a circuit structure.

By adding at least one light emission control transistor for controlling a driving current flowing to the OLED by a light emission control signal to a pixel circuit of FIG. 2, a structure of 6TR1CAP that is formed with six transistors and one capacitor can be formed.

Image compensation of the display panel 200 that is formed with a pixel in an embodiment of FIG. 2 is performed by controlling an initialization voltage that is applied to a gate terminal of a driving transistor that transfers a driving current of the OLED.

The pixel of FIG. 2 includes an OLED and a driving transistor M1 that transfers a driving current to the OLED. The pixel of FIG. 2 includes a switching transistor M2, a threshold voltage compensation transistor M3, an initialization transistor M4, and a storage capacitor Cst.

The driving transistor M1 includes a gate electrode that is connected to a first node N1, a first electrode that is connected to a driving power source voltage (ELVDD) supply source of a high level that is supplied from the outside, and a second electrode that is connected to an anode electrode of the OLED. When the driving transistor M1 is turned on, the driving transistor M1 transfers a driving current of a data voltage according to a data signal that is written in the first node N1 to the OLED, thereby emitting light of predetermined luminance.

The switching transistor M2 includes a gate electrode that is connected to a corresponding scan line of a plurality of scan lines, a first electrode that is connected to a corresponding data line of a plurality of data lines, and a second electrode that is connected to the first node N1. When the switching transistor M2 is turned on, the switching transistor M2 transfers a data voltage Vdata according to a data signal through the data line to the first node N1 to which a gate electrode of the driving transistor M1 is connected.

The threshold voltage compensation transistor M3 includes a gate electrode that is connected to a corresponding first control line of a plurality of first control lines, a first electrode that is connected to the first node N1 to which a gate electrode of the driving transistor M1 is connected, and a second electrode that is connected to a second electrode of the driving transistor M1. The first control line is a control line that supplies a compensation control signal GC that controls compensation of a threshold voltage of the driving transistor M1. When the threshold voltage compensation transistor M3 is turned on in response to the compensation control signal GC, by diode-connecting the gate electrode and the second electrode of the driving transistor M1, the threshold voltage compensation transistor M3 enables the driving transistor M1 to be a diode.

Further, the initialization transistor M4 includes a gate electrode that is connected to a corresponding second control line of a plurality of second control lines, a first electrode that connects the supply of an initialization voltage Vinit to an initialization voltage wire, and a second electrode that is connected to the first node N1. The second control line is a control line that supplies an initialization control signal INT that controls the supply of an initialization voltage Vinit for initializing a previously written data voltage in data writing of the driving transistor M1 and a driving process that displays the data writing. When the initialization transistor M4 is turned on in response to the initialization control signal INT, the initialization transistor M4 initializes a previous data voltage that is written in a gate electrode of the driving transistor M1 by applying the initialization voltage Vinit to a gate electrode of the driving transistor M1.

The storage capacitor Cst includes one electrode that is connected to a driving power source voltage ELVDD supply source to which the first electrode of the driving transistor M1 is connected and the other electrode that is connected to the first node N1. Because the storage capacitor Cst charges a voltage according to a voltage difference that is applied to the two electrodes, the storage capacitor Cst sustains a voltage of a difference between a changing voltage according to a voltage change that is applied to the first node N1 and the driving power source voltage ELVDD for a predetermined period.

A transistor included in the pixel in FIG. 2 is a PMOS transistor, but this is an example and may be an NMOS transistor. Therefore, in FIG. 2, a gate-on voltage that turns on a transistor is a predetermined low level, but when the type of transistor is changed, a gate-on voltage level is changed to an opposite level.

Figure 3:
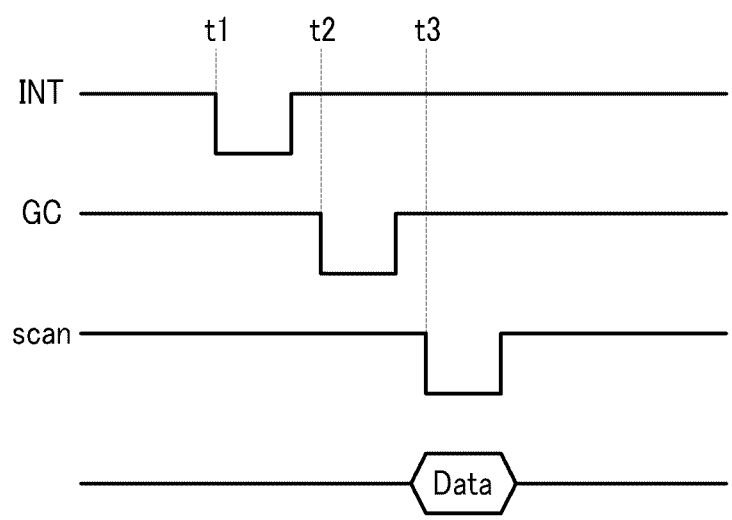
FIG. 3 is a signal timing diagram illustrating driving of a pixel circuit of FIG. 2.

A process of driving the OLED using a structure of a pixel according to an embodiment of FIG. 2 will be described using a timing diagram of FIG. 3.

First, at a time point t1, a level of the initialization control signal INT is converted to a predetermined low level, which is a gate-on level of a transistor that is included in the pixel of FIG. 2. When the initialization control signal INT of a low level is transferred to the initialization transistor M4 through a second control line, the initialization transistor M4 of the pixel is turned on. Thereafter, the initialization voltage Vinit is applied to the first node N1. After the storage capacitor Cst is charged to a voltage value corresponding to a previous data voltage, the storage capacitor Cst is gradually discharged by the initialization voltage Vinit that is applied to the other electrode of the storage capacitor Cst that is connected to the first node N1. That is, a charge voltage of the storage capacitor Cst changes from a voltage corresponding to a previous data voltage to a voltage difference that is applied to both ends of the storage capacitor Cst, i.e., to a voltage of a difference between the driving power source voltage ELVDD and the initialization voltage Vinit.

Next, at a time point t2, the compensation control signal GC is converted to a low level, which is a gate-on voltage level by a first control line. When the threshold voltage compensation transistor M3 is turned on in response to the compensation control signal GC of a low level, a gate electrode and a second electrode of the driving transistor M1 are diode-connected. When the gate electrode and the drain electrode of the driving transistor M1 are connected, the driving transistor functions as a diode and thus a threshold voltage Vth of the driving transistor M1 is applied to the first node N1.

Thereafter, after the storage capacitor Cst is sustained to a voltage value corresponding to the initialization voltage Vinit, the storage capacitor Cst is discharged to a voltage value corresponding to the threshold voltage Vth of the driving transistor M1. A compensation time for compensation of a threshold voltage is a time in which the storage capacitor Cst is charged to a voltage corresponding to an initialization voltage at the time point t1 and is discharged to a voltage corresponding to a threshold voltage of the driving transistor at the time point t2.

Therefore, according to an embodiment of the present invention, when setting and applying the initialization voltage Vinit to different values corresponding to a threshold voltage of the driving transistor M1, a threshold voltage of a pixel can be fully compensated at the same compensation time.

Thereafter, at a time point t3, a scanning signal scan is converted to a predetermined low level, which is a gate-on level. The scanning signal scan of a low level is transferred to the switching transistor M2 through a corresponding scanning line of a pixel, and the switching transistor M2 is turned on. Thereafter, a data voltage Vdata according to a data signal is applied to the first electrode of the switching transistor M2 and is transferred to the first node N1. The storage capacitor Cst is sustained to a voltage value corresponding to the data voltage Vdata according to the data signal for a data writing period Data.

When a voltage level of the scanning signal scan is increased to a high level, the switching transistor M2 is turned off and data writing is terminated. Therefore, the driving transistor M1 enables a driving current corresponding to a voltage corresponding to a voltage difference of both ends between a gate electrode and a source electrode, i.e., a voltage that is sustained in the storage capacitor Cst to flow to the OLED, thereby emitting light.

Even if threshold voltages of the driving transistor are different due to a characteristic of a pixel, the threshold voltages have been already fully compensated before data writing and thus light is emitted with accurate luminance according to the data voltage Vdata regardless of threshold voltage characteristics.

An initialization voltage application process and a threshold voltage compensation process of a pixel according to an embodiment of the present invention in a driving process of FIGS. 2 and 3 will be described in detail using graphs of FIGS. 4 and 5.

Figure 4:
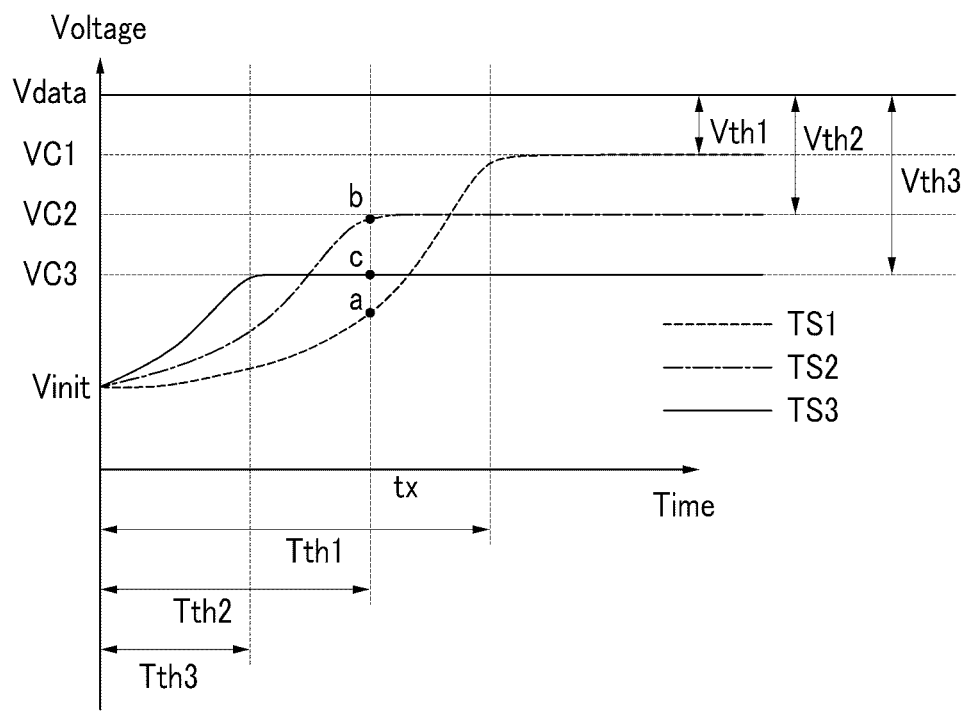
FIG. 4 is a graph illustrating a relationship between threshold voltage scattering and a compensation time of a driving transistor.

FIG. 4 is a graph illustrating a relationship between threshold voltage scattering and a compensation time of a driving transistor.

FIG. 4 illustrates a first pixel TS1, a second pixel TS2, and a third pixel TS3 in which threshold voltage characteristics of a driving transistor are not uniform according to polysilicon characteristics, a production process, a production method, and/or an environment of a base substrate of a pixel. The first pixel TS1 to the third pixel TS3 are included in one display panel.

In one embodiment of the present invention, a transistor constituting pixels is a PMOS and thus the embodiment will be described based on the PMOS. Therefore, in a graph of FIG. 4, a predetermined data voltage Vdata may be varied from a minus value. That is, in a graph of FIG. 4, an increase of a Y-axis represents an increase of an absolute value in a negative area.

A threshold voltage of a driving transistor of the first pixel is VC1 adjacent to the predetermined data voltage Vdata, a threshold voltage of a driving transistor of the second pixel is VC2, and a threshold voltage of a driving transistor of the third pixel is VC3. Therefore, differences between the predetermined data voltage Vdata and threshold voltage values of a driving transistor of the first to third pixels are Vth1, Vth2, and Vth3.

In order to compensate a threshold voltage of each constituent transistor, a gate electrode and a drain electrode of the constituent transistor are diode-connected and thus gate electrode voltages should be sustained to respective corresponding threshold voltage values VC1 to VC3.

However, as described above, in pixel driving of FIG. 2, before compensation of a threshold voltage, an initialization voltage is applied to a gate electrode of a driving transistor.

Conventionally, such an initialization voltage Vinit was applied as a predetermined identical value, as shown in a graph of FIG. 4.

Therefore, a compensation period that falls from the initialization voltage Vinit to threshold voltages VC1 to VC3 of each driving transistor of the first to third pixels is changed. That is, in a driving transistor of the first pixel, a compensation time that is taken when a current escapes from the initialization voltage Vinit to the threshold voltage VC1 is Tth1 and is the longest. However, in a driving transistor of the third pixel, a compensation time that is taken when a current escapes from the initialization voltage Vinit to the threshold voltage VC3 is Tth3 and is the shortest.

In this way, according to threshold voltage characteristics of a driving transistor, compensation times Tth1 to Tth3 are different.

When the display device is driven with a high speed, does not secure an enough compensation time, and compensates a threshold voltage for the same predetermined reference compensation time tx, a gate voltage value of a driving transistor of the second pixel arrives at "b", a gate voltage value of a driving transistor of the third pixel arrives at "c" and thus each threshold voltage is fully compensated, but a gate voltage value of a driving transistor of the first pixel arrives at "a" and thus a threshold voltage is not compensated.

Thereafter, when a data voltage is applied according to a data signal, the first pixel TS1 outputs a voltage different from an intended data voltage and has a light emitting degree different from that of other pixels of the display panel 200.

Therefore, an image compensation apparatus 100 according to an embodiment of the present invention differently sets and applies a voltage value of the initialization voltage Vinit that is applied to a gate voltage of a driving transistor of a pixel to correspond to a threshold voltage of the driving transistor.

Figure 5:
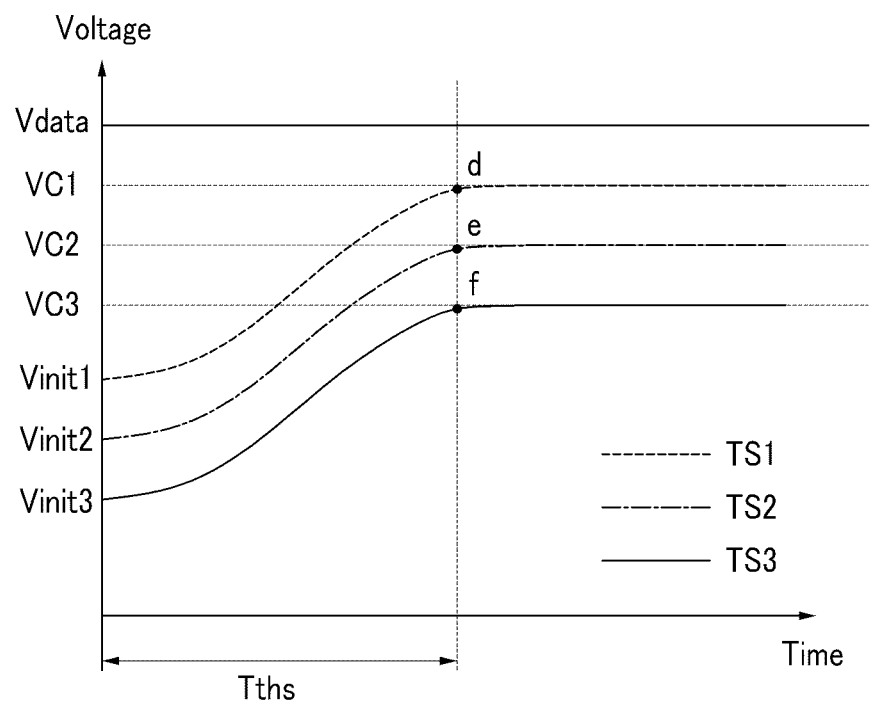
FIG. 5 is a graph illustrating a threshold voltage compensation degree of a driving transistor when applying a method of compensating an image according to an embodiment of the present invention.

FIG. 5 is a graph illustrating compensation of a threshold voltage of a driving transistor when applying a method of compensating an image according to an embodiment of the present invention of FIG. 4.

The voltage controller 130 of the image compensation apparatus 100 differently sets an initialization voltage to correspond to a threshold voltage of a driving transistor of each of the first pixel to the third pixel TS1 to TS3. That is, an initialization voltage Vinit1 that is applied to the first pixel TS1, an initialization voltage Vinit2 that is applied to the second pixel TS2, and an initialization voltage Vinit3 that is applied to the third pixel TS3 are differently set to correspond to a threshold voltage of a driving transistor of each pixel.

At a time point in which a predetermined compensation time Tths is terminated, each of the initialization voltages Vinit1 to Vinit3 that are differently set in the voltage controller 130 may be controlled so that a gate voltage value of a driving transistor of each pixel is sustained to an enough voltage value to compensate each threshold voltage.

That is, the initialization voltage Vinit1 is set to a voltage lower than an initialization voltage of other pixels so that the initialization voltage Vinit1 that is applied to the first pixel TS1 may fully arrive at a voltage value "d" of a threshold voltage VC1 of the driving transistor of the first pixel TS1 for the compensation time Tths.

The initialization voltage Vinit2 that is applied to the second pixel TS2 is set to fully arrive at a voltage value "e" of a threshold voltage VC2 of a driving transistor of the second pixel TS2 for the compensation time Tths.

Further, the initialization voltage Vinit3 that is applied to the third pixel TS3 is set to a voltage higher than an initialization voltage of other pixels so that the initialization voltage Vinit3 may arrive at a voltage value "f" of a threshold voltage VC3 of a driving transistor of the third pixel TS3 for the compensation time Tths.

In order to fully compensate a threshold voltage of a driving transistor of each pixel for the same compensation period, as shown in FIG. 5, by differently setting and applying an initialization voltage, a gate-source voltage Vgs of each driving transistor is output with the same value for the same data voltage and thus a driving current is determined. Therefore, even if a threshold voltage of a driving transistor of a pixel of the display panel 200 is differently distributed, a driving current according to the same data signal is equally determined and thus when emitting light, an image is displayed with uniform luminance and stain phenomenon is prevented.

The first to third pixels of FIGS. 4 and 5 illustrate an individual pixel in which threshold voltages of a driving transistor are different, but are not limited thereto and can be applied to different pixel lines, different blocks, and different frames.

Figure 6:
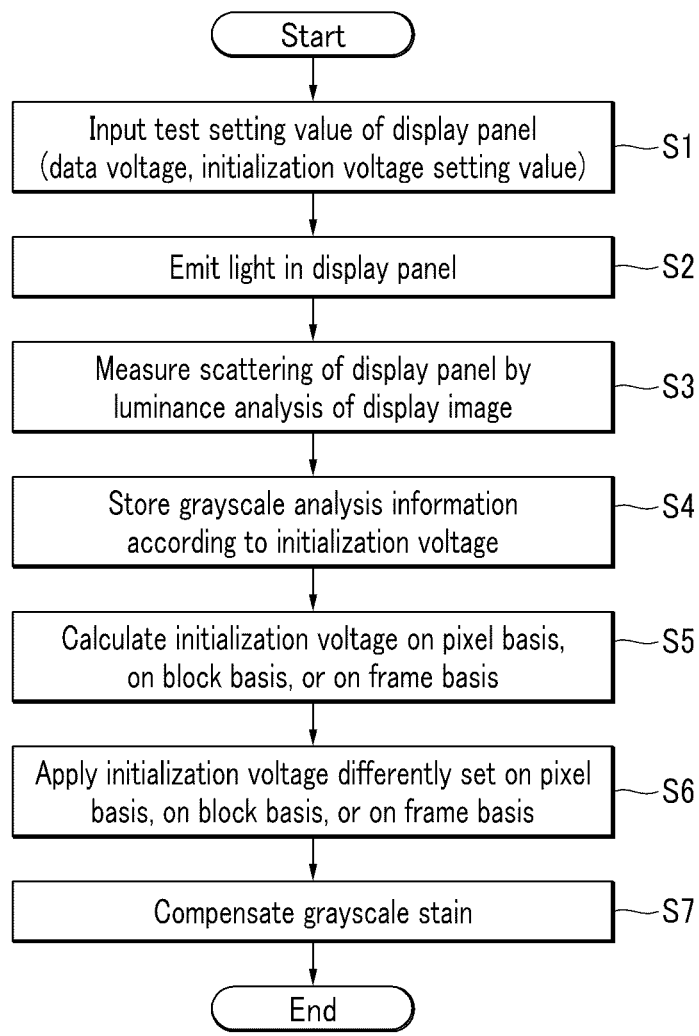
FIG. 6 is a flowchart illustrating a method of compensating an image according to an embodiment of the present invention.

FIG. 6 is a flowchart illustrating a method of compensating an image according to an embodiment of the present invention.

First, a test setting value is input to the display panel 200 (S1). The test setting value may be a predetermined data voltage setting value and a predetermined initialization voltage setting value that are applied to each pixel in order to measure threshold voltage scattering of a driving transistor of pixels that are included in the display panel 200.

Each pixel of the display panel 200 receives an input of the test setting value, is driven, and emits light with predetermined luminance (S2). That is, each pixel of the display panel 200 is initialized to the same voltage by the test initialization voltage setting value and emits light by a driving current corresponding to the test data voltage.

In this case, by performing luminance analysis of a display image of the display panel 200, threshold voltage scattering of the driving transistor of each pixel of the display panel 200 is measured (S3). That is, target luminance according to the test data voltage is determined, but as threshold voltages of a driving transistor of each pixel belonging to the display panel 200 are different, light is emitted with actual luminance. At step S3, a predetermined threshold range of target luminance is set, and a degree that deviates from the threshold range is measured by measuring actual luminance, and the degree is analyzed on an area basis.

Such an analysis process is repeatedly performed while changing a test initialization voltage. That is, steps S1 to S3 are repeatedly performed while changing a test initialization voltage. For example, while increasing or decreasing an initialization voltage at a predetermined interval in a range of −2V to 0V according to a grayscale of a test data signal, by displaying a test image of the display panel 200, a mura expression degree in the display panel 200 is obtained.

While differently setting a test initialization voltage, information that is analyzed on a grayscale basis of a data signal is stored in, for example, a lookup table form (S4). The stored analysis information is a table in which an image of test data according to a test initialization voltage is actually displayed with a grayscale value.

An initialization voltage that is applied on a pixel basis, on a block basis, or on a frame basis is calculated using grayscale analysis information according to an initialization voltage that is stored in the storage unit 120 (S5). In this case, when displaying an image of the display panel 200 while changing a test initialization voltage value, a calculated initialization voltage may be determined to a level in which grayscale stain does not occur. Here, the block indicates a pixel area that is included in at least one pixel line.

A reference area that differently applies an initialization voltage is determined according to information that is analyzed in a scattering measurement process of the display panel 200. That is, it is determined whether to apply different initialization voltages on a pixel basis, on a block basis, or on a frame basis according to an analysis pattern of the display panel 200 in which actual luminance is displayed to correspond to target luminance.

After the reference area is determined, differently set initialization voltages are applied on a pixel basis, on a block basis, or on a frame basis (S6). As described above, an embodiment that applies an initialization voltage on a pixel basis and an embodiment that applies an initialization voltage on a block basis and on a frame basis may be different.

At step S6, when an initialization voltage is differently applied according to scattering of a threshold voltage, a threshold voltage of different driving transistors can be fully compensated even in a predetermined compensation time to be limited in high speed driving. Therefore, grayscale stain is compensated in the display panel 200 (S7), and thus a high image quality of screen can be embodied.

Further, a portion of constituent elements that are described in the present specification may be omitted without deterioration of a performance or a constituent element may be added to improve a performance thereof by a person of an ordinary skill in the art. Further, an order of a method step that is described in the present specification may be changed according to a process environment or an equipment by a person of an ordinary skill in the art.

While this invention has been described in connection with certain embodiments, it is to be understood that the invention is not limited to the disclosed embodiments, but, on the contrary, is intended to cover various modifications and equivalent arrangements included within the spirit and scope of the appended claims.

| Description of symbols | |
| --- | --- |
| 100: image compensation apparatus | 200: display panel |
| 110: scattering measurement unit | 120: storage unit |
| 130: voltage controller | 140: initialization voltage supply unit |

What is claimed is:

1. An image compensation apparatus of a display device comprising a display panel that displays an image according to a data signal, the image compensation apparatus comprising:

a scatterometer configured to analyze luminance of a display image according to a test initialization voltage and a test data voltage applied to a plurality of pixels included in the display panel and to measure a deviation of a threshold voltage of a driving transistor of the plurality of pixels;

a voltage controller configured to divide the display panel into a predetermined area according to a deviation of a threshold voltage of the driving transistor and to calculate different initialization voltages that initialize driving of a plurality of pixels included in the area on a predetermined area basis; and an initialization voltage supplier configured to apply a corresponding initialization voltage calculated in the voltage controller to a plurality of pixels included in the predetermined area, wherein the initialization voltage is applied to a gate electrode of a driving transistor of each of the plurality of pixels before a data voltage is applied to each of the plurality of pixels, wherein the voltage controller is configured to calculate each of the different initialization voltages that initialize driving of the plurality of pixels in the area on the predetermined area basis as a voltage value for corresponding end points of a compensation period of a threshold voltage of a driving transistor of a plurality of pixels included in the predetermined area, wherein the initialization voltage supplier comprises a plurality of resistors coupled in series, and is configured to divide a predetermined reference voltage into different initialization voltage values calculated in the voltage controller, and to supply the different initialization voltage values through an initialization voltage wire connected to each of the plurality of pixels, and wherein each of the plurality of pixels comprises:
an organic light emitting diode (OLED) configured to emit light according to a driving current corresponding to a data signal;
a driving transistor configured to transfer a driving current corresponding to the data signal to the OLED;
a switching transistor configured to transfer a data voltage according to the data signal to a gate electrode of the driving transistor;
a threshold voltage compensation transistor configured to diode-connect a gate electrode and a drain electrode of the driving transistor; and
an initialization transistor configured to apply a corresponding initialization voltage calculated in the voltage controller to the gate electrode of the driving transistor.

2. The image compensation apparatus of claim 1, further comprising a data store configured to store luminance analysis information according to the test initialization voltage and the test data voltage received from the scatterometer.

3. The image compensation apparatus of claim 1, wherein the scatterometer is configured to measure actual luminance for target luminance of the test data voltage and to divide a deviation of a threshold voltage of the driving transistor according to a degree that deviates from a threshold range of target luminance.

4. The image compensation apparatus of claim 1, wherein the predetermined area is one of at least one pixel, at least one pixel line, at least one block comprising a plurality of pixel lines, or an entire pixel that emits light in one frame.

5. The image compensation apparatus of claim 1, wherein the initialization voltage initializes a previously written data voltage.

6. The image compensation apparatus of claim 1, wherein the each of different initialization voltages is determined as one value of an average value, a maximum value, a minimum value, and a median of a plurality of voltage values that correspond to end points of a threshold voltage compensation period of a driving transistor of a plurality of pixels included in each of the predetermined area.

7. The image compensation apparatus of claim 1, wherein the initialization voltage supplier is configured to differently apply the different initialization voltages according to a division form of the predetermined area.

8. The image compensation apparatus of claim 1, wherein the initialization voltage supplier comprises a plurality of resistors coupled in series, is configured to divide a predetermined reference voltage into different initialization voltage values calculated in the voltage controller, and to supply the different initialization voltage values through a data line connected to each of the plurality of pixels.

9. The image compensation apparatus of claim 1, wherein each of the plurality of pixels further comprises a storage capacitor connected between the gate electrode of the driving transistor and a driving power source voltage source of the pixel.

10. A method of compensating an image of a display device, the method comprising:
displaying a test image by applying a test initialization voltage and a test data voltage to a plurality of pixels included in a display panel;
measuring a deviation of a threshold voltage of a driving transistor of the plurality of pixels by analyzing luminance of the test image of the display panel;
dividing the display panel into a predetermined area according to the deviation of a threshold voltage of the driving transistor and calculating different initialization voltages that initialize driving of a plurality of pixels included in the area on the predetermined area basis; and
applying the calculated corresponding initialization voltage to the plurality of pixels included in the predetermined area, wherein the calculated corresponding initialization voltage is applied to a gate electrode of a driving transistor of each of the plurality of pixels before a data voltage is applied to each of the plurality of pixels, wherein the different initialization voltages that initialize driving of the plurality of pixels in the area on the predetermined area basis are calculated as a voltage value for corresponding end points of a compensation period of a threshold voltage of a driving transistor of a plurality of pixels included in the predetermined area, wherein the initialization voltage supplier comprises a plurality of resistors coupled in series, and is configured to divide a predetermined reference voltage into different initialization voltage values calculated in the voltage controller and to supply the different initialization voltage values through an initialization voltage wire connected to each of the plurality of pixels, and wherein each of the plurality of pixels comprises:
an organic light emitting diode (OLED) configured to emit light according to a driving a wing to a data signal;
a driving transistor configured to transfer a driving current corresponding to the data signal to the OLED;
a switching transistor configured to transfer a data voltage according to the data signal to a gate electrode of the driving transistor;
a threshold voltage compensation transistor configured to diode-connect a gate electrode and a drain electrode of the driving transistor; and
an initialization transistor configured to apply a corresponding initialization voltage calculated in the voltage controller to the gate electrode of the driving transistor.

11. The method of claim 10, wherein the displaying of the test image and the measuring of the deviation are repeatedly performed by diversely setting up the test initialization voltage and the test data voltage.

12. The method of claim 10, wherein the measuring of the deviation comprises storing luminance analysis information that analyzes a test image of the display panel according to the test initialization voltage and the test data voltage.

13. The method of claim 10, wherein the measuring of the deviation comprises measuring actual luminance for target luminance of the test data voltage and dividing a deviation of a threshold voltage of the driving transistor according to a degree that deviates from a threshold range of the target luminance.

14. The method of claim 10, wherein the predetermined area is one of at least one pixel, at least one pixel line, and at least one block comprising a plurality of pixel lines, or an entire pixel that emits light in one frame.

15. The method of claim 10, wherein the applying of the calculated corresponding initialization voltage comprises differently applying the calculated different initialization voltages according to a division form of the predetermined area.

16. The method of claim 15, wherein the calculated different initialization voltages are applied through a data line of the pixel, when the predetermined area is at least one pixel.

17. The method of claim 15, wherein the calculated different initialization voltages are applied through an initialization voltage wire that is connected to the pixel, when the predetermined area is one of at least one pixel line, at least one block comprising a plurality of pixel lines, or an entire pixel that emits light in one frame.

18. The method of claim 10, wherein the applying of the calculated corresponding initialization voltage is performed before a threshold voltage of a driving transistor of each of the plurality of pixels is compensated among a driving period in order to display an image according to a data signal corresponding to each of a plurality of pixels that are included in the display panel.

\* \* \* \* \*